(12) United States Patent
Zink

(10) Patent No.: US 9,818,993 B1
(45) Date of Patent: Nov. 14, 2017

(54) WEARABLE POWER SUPPLY SYSTEM

(71) Applicant: Lana Mae Zink, Allegany, NY (US)

(72) Inventor: Lana Mae Zink, Allegany, NY (US)

( * ) Notice: Subject to any disclaimer, the term of this patent is extended or adjusted under 35 U.S.C. 154(b) by 0 days.

(21) Appl. No.: 15/471,400

(22) Filed: Mar. 28, 2017

(51) Int. Cl.
| | |
|---|---|
| *H01M 2/02* | (2006.01) |
| *H01M 2/10* | (2006.01) |
| *H01M 2/20* | (2006.01) |
| *A41D 27/20* | (2006.01) |
| *A41D 1/04* | (2006.01) |
| *A41D 13/04* | (2006.01) |
| *A41D 20/00* | (2006.01) |
| *A42B 1/24* | (2006.01) |
| *A44C 15/00* | (2006.01) |
| *A45F 3/04* | (2006.01) |

(52) U.S. Cl.
CPC ............ *H01M 2/1022* (2013.01); *A41D 1/04* (2013.01); *A41D 13/04* (2013.01); *A41D 20/00* (2013.01); *A41D 27/205* (2013.01); *A42B 1/241* (2013.01); *A44C 15/003* (2013.01); *A44C 15/005* (2013.01); *A45F 3/04* (2013.01); *H01M 2/204* (2013.01); *H01M 2220/30* (2013.01)

(58) Field of Classification Search
CPC ... H05B 1/00; A41D 27/20; H02J 7/00; G06F 1/16; H04N 5/645; H01M 2/02; H01M 2/10; H01M 2/12; H01M 2/22
See application file for complete search history.

(56) References Cited

U.S. PATENT DOCUMENTS

| | | | | |
|---|---|---|---|---|
| 2009/0289046 | A1* | 11/2009 | Richmond | ......... A41D 13/0051 219/211 |
| 2011/0133695 | A1* | 6/2011 | Cadway | .................... B25F 5/00 320/114 |
| 2011/0197742 | A1* | 8/2011 | Liotta | .................. H04R 1/1033 84/725 |

* cited by examiner

*Primary Examiner* — Mark F Huff
*Assistant Examiner* — Monique Wills
(74) *Attorney, Agent, or Firm* — Dunlap Bennett & Ludwig PLLC

(57) ABSTRACT

A wearable power source system is provided. The wearable power source system embodies a wearable power assembly having a wearable adapted to retain a power source, and a tool adapted to be powered by the retained power source. An electrical connection may connect the tool to the power source. A user may don the wearable power assembly, whereby a tool's power source is worn by its user, making handling the tool less of a burden. Clothing relative to the wearable power source system will be designed and become part of the user. Slacks, jackets, vest, apron, wristband, belt, hat jewelry, belly/fanny pack, and other such clothing/personal embodiment items will be designed to become part of the person and the wearable power source system.

7 Claims, 5 Drawing Sheets

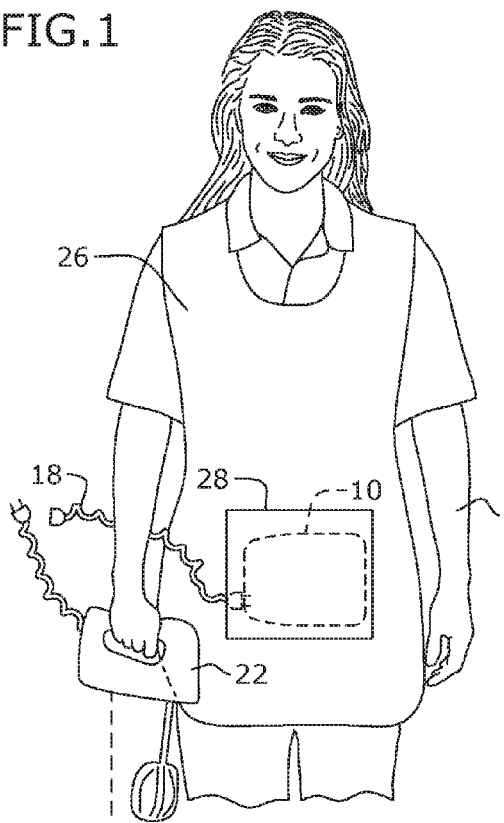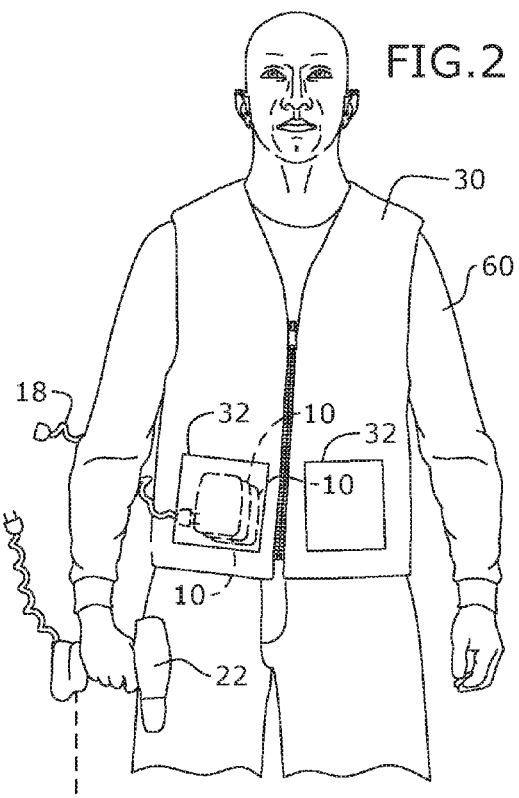

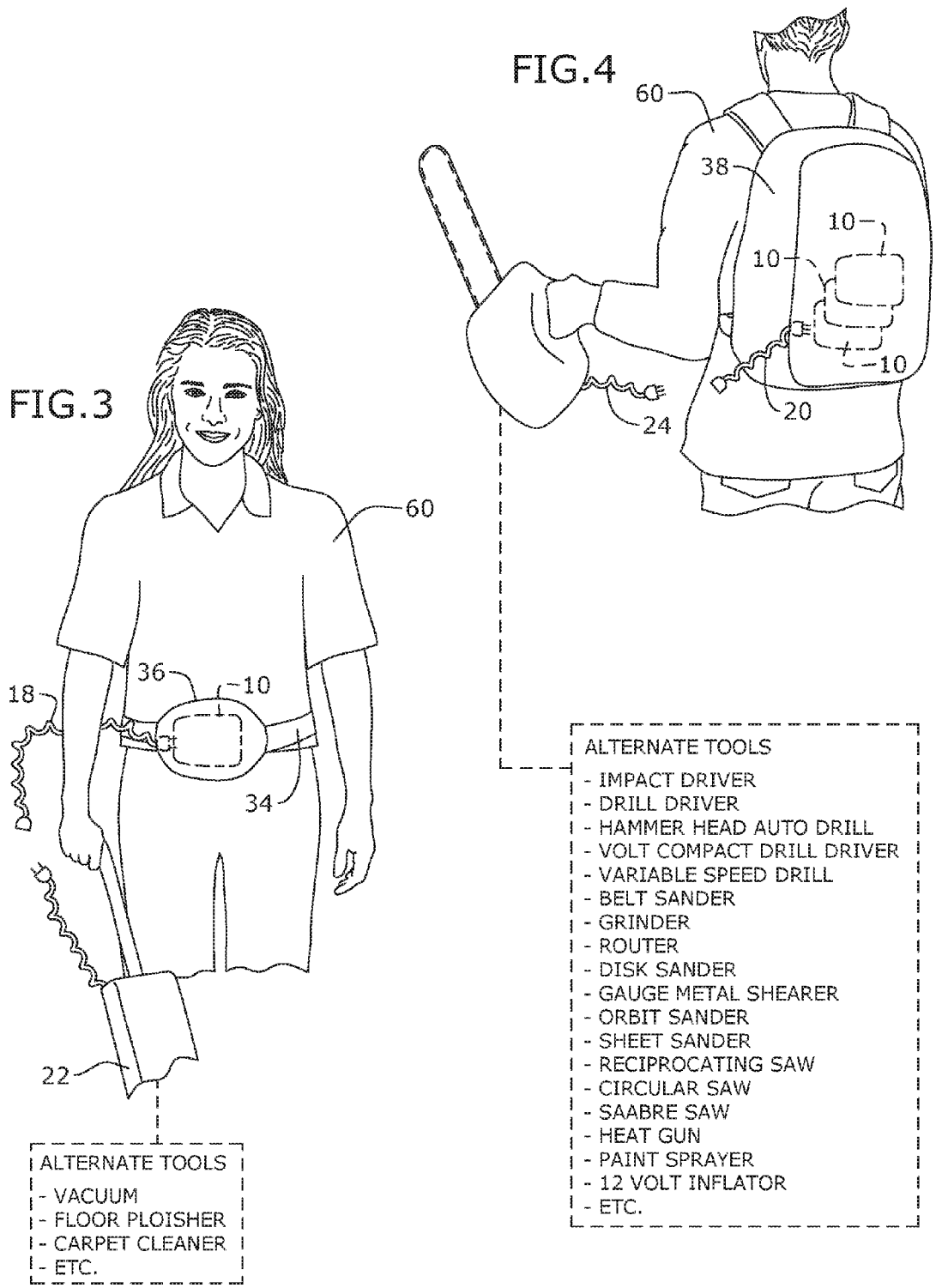

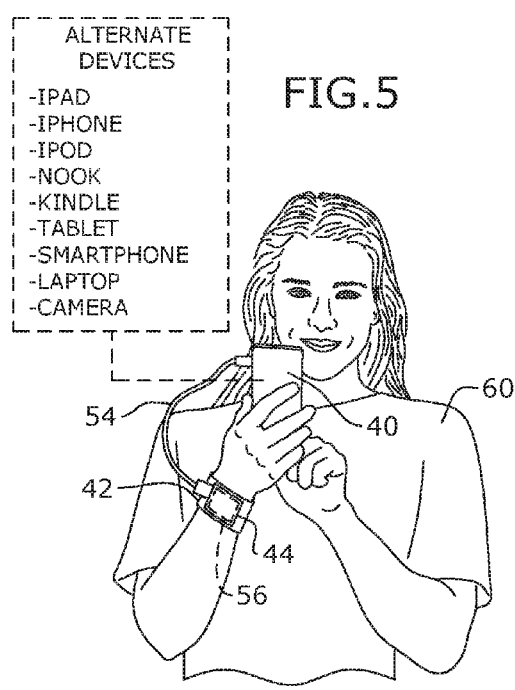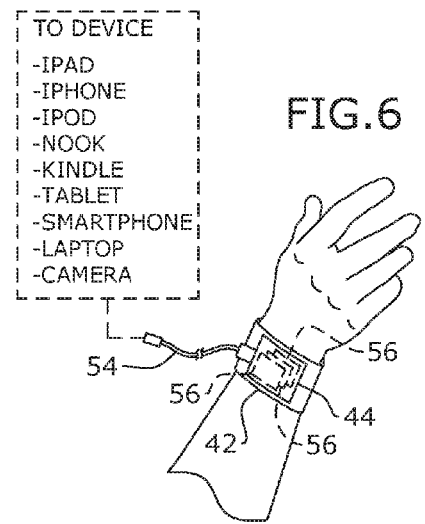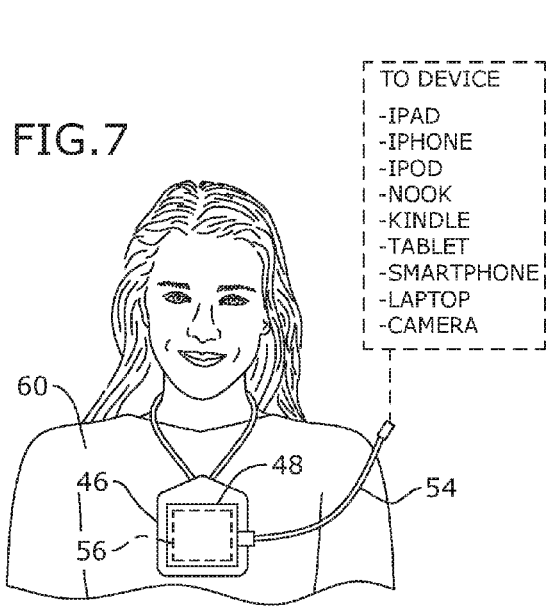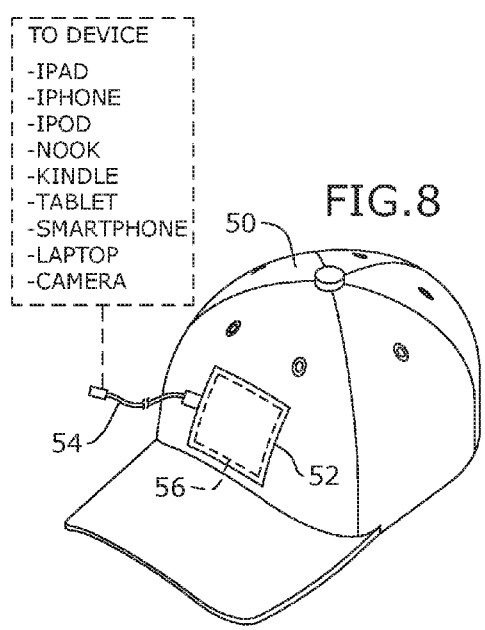

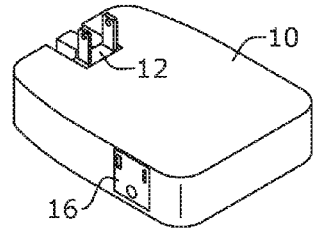
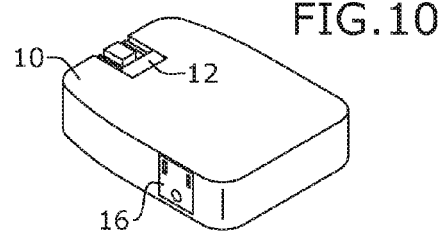
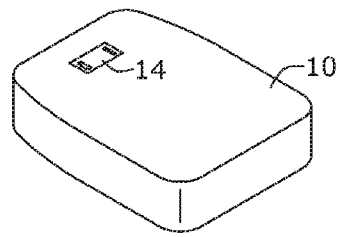
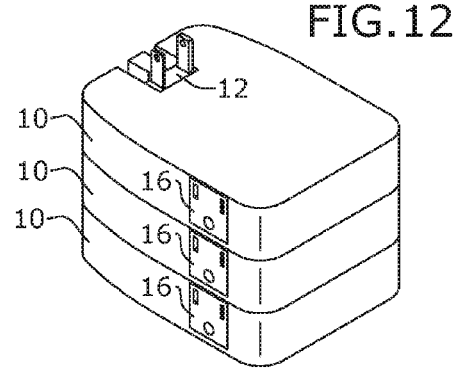
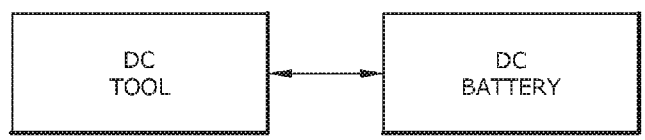
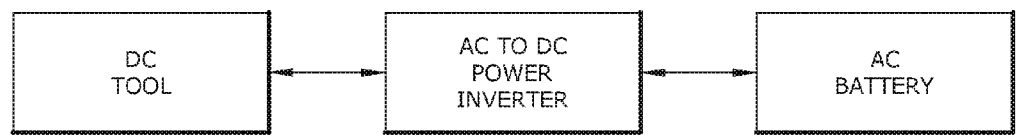

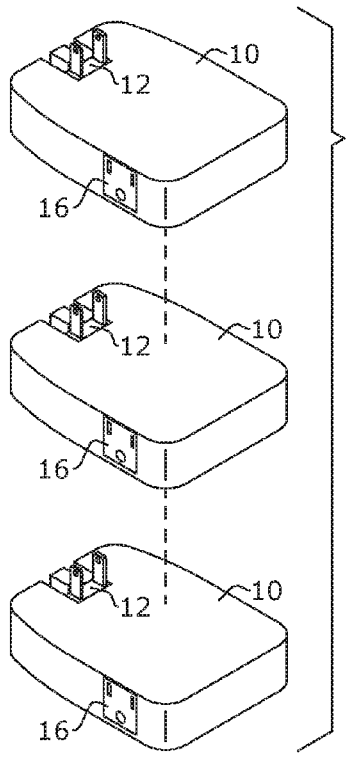
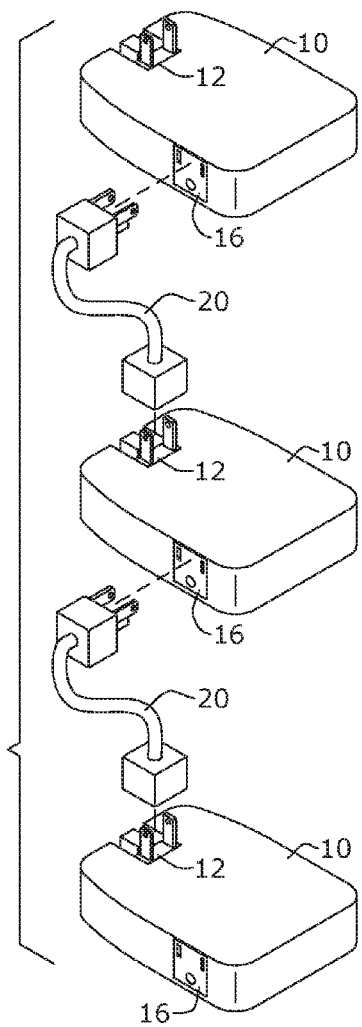
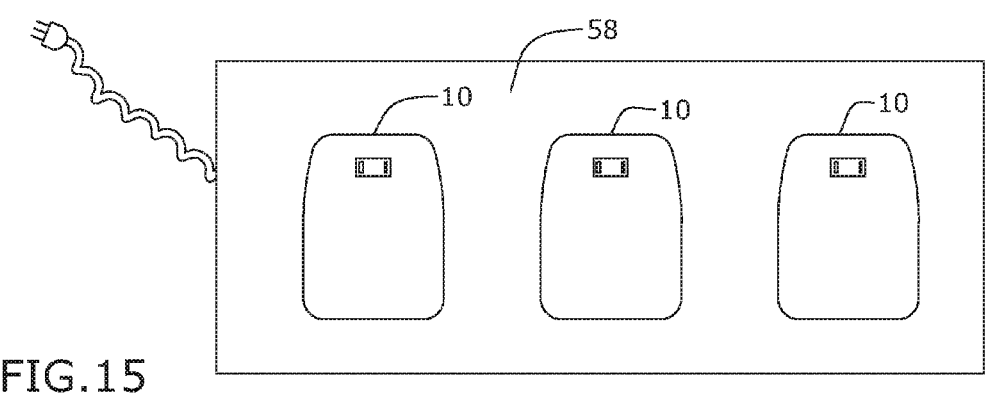

WEARABLE POWER SUPPLY SYSTEM

BACKGROUND OF THE INVENTION

The present invention relates to power supply systems and, more particularly, to a wearable power supply system.

Present day tools of contractors and other service industries all have problems addressed by the present invention. Contractor and lawn tools have limited battery life, and other similar tools may require a long extension cord to run. Unfortunately, the second type of tools can be clumsy and the first type of tool can be heavy on the arm/hand after extended use, making an inopportune disconnection or cutting of said cord a possibility. Kitchen and household electrical tools, always require an electrical outlet to be nearby to run, making them impractical to transfer to other spaces which may be the more suitable place for their use. Even for tools that are not heavy, such as cell phones, laptops, tablets and the like, limited battery life can make them unavailable even when and where the tool user is available. And batteries have not been made to be used for extended periods of time, for example, a whole 8-hour work day. Furthermore, the battery to one tool is not interchangeable to another tool or another brand of tool. Generally, a person has to go home to find the battery to their tool or device; it is just not with them at all times.

As can be seen, there is a need for a wearable power supply system whereby, in certain embodiments, the battery is worn and carried by the user instead of on the tool, and wherein the power source of the power supply system is interchangeable for various tools and can be amplified by piggybacking in use or stored on their body for ready use. As a result of the present invention, a user becomes one with the equipment that the user automatically wears as part of their clothing, so that it is always with them and is easier to handle that the current arrangements of tools and their power supplies.

SUMMARY OF THE INVENTION

In one aspect of the present invention, a wearable power supply assembly includes a wearable providing a power supply enclosure, wherein the wearable is dimensioned and adapted to be worn by a human user; and a power supply removably housed in the power supply enclosure.

In another aspect of the present invention, the wearable power supply assembly includes a wearable providing a power supply enclosure, wherein the wearable is dimensioned and adapted to be worn by a human user; a power supply removably housed in the power supply enclosure, wherein the power supply includes a piggybacked configuration of a plurality of batteries; a tool not having a separate power supply attached thereto; a first electrical connection interconnecting the tool and the power source; and each battery of the plurality of batteries provides a first female plug provided along its periphery; a second female plug provided on a second face; a male prong provided on a first face, wherein the first face is on an opposing side of said battery relative to the second face, and wherein the male prong and the second female plug align for each two adjacent batteries of the plurality of batteries in the piggybacked configuration; and a second electrical connection electrically connecting the male prong and the first female plug of each two adjacent batteries of the plurality of batteries in the piggybacked configuration.

These and other features, aspects and advantages of the present invention will become better understood with reference to the following drawings, description and claims.

BRIEF DESCRIPTION OF THE DRAWINGS

FIG. 1 is a perspective view of an exemplary embodiment of the present invention, shown in use in a first embodiment;

FIG. 2 is a perspective view of an exemplary embodiment of the present invention, shown in use in a second embodiment;

FIG. 3 is a perspective view of an exemplary embodiment of the present invention, shown in use in a third embodiment;

FIG. 4 is a perspective view of an exemplary embodiment of the present invention, shown in use in a fourth embodiment;

FIG. 5 is a perspective view of an exemplary embodiment of the present invention, shown in use in a fifth embodiment;

FIG. 6 is a perspective view of an exemplary embodiment of the present invention, shown in use in the fifth embodiment;

FIG. 7 is a perspective view of an exemplary embodiment of the present invention, shown in use in a sixth embodiment;

FIG. 8 is a perspective view of an exemplary embodiment of the present invention, shown in use in a seventh embodiment;

FIG. 9 is a bottom perspective view of an exemplary embodiment of a power supply of the present invention;

FIG. 10 is a bottom perspective of an exemplary embodiment of the power supply in a closed condition of the present invention;

FIG. 11 is a top perspective view of an exemplary embodiment of the power supply of the present invention;

FIG. 12 is a bottom perspective view of an exemplary embodiment of the power supply of the present invention, demonstrating a piggybacked condition;

FIG. 13 is an exploded perspective of an exemplary embodiment of the power supply of the present invention, demonstrating the piggybacked condition;

FIG. 14 is an exploded perspective view of an exemplary embodiment of the power supply of the present invention, demonstrating an alternative attachment;

FIG. 15 is a top view of an exemplary embodiment of a multiple power supply and re-charging unit of the present invention;

FIG. 16A is a voltage flow schematic of the present invention; and

FIG. 16B is a schematic with power inverter of the present invention;

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a wearable power assembly providing a wearable retaining a power source, and a tool adapted to be powered by the retained power source. An electrical connection may connect the tool to the power source. As a result, a user dons the wearable and becomes one with the equipment whose power source the user automatically wears as part of their clothing, making handling tools and their power supplies easier.

Referring to FIGS. 1 through 16B, the present invention may include wearables, such as an apron 26, a vest 30, a belly-pack 34, a wristband 42, a necklace 46, a cap 50 and the like, each such wearable providing a sealable pocket 28, 32, 36, 44, 48, 52 respectively, such as a backpack 38 would have. The sealable pocket removably houses or encloses a power source 10 or 56 for supplying power to tools or electronic devices 40 such as the smart phones, tablets and the like, respectively, via electrically connections 20, 24 and 54, such as power cords. The wearables are dimensioned and adapted to be worn comfortably by users 60 of the tools/devices.

The power source 10 may be rechargeable batteries having a body providing male prong 12 and a female two- and three-prong plug 14 and 16, respectively. The electrical connections 22 and 24 provide male two prongs 18 and three prongs 20, respectively, for electrically mating with their corresponding plugs. The power sources 10 and 56 may be adapted so that more than one can be piggybacked together in a parallel circuit configuration enabling the user 60 to have more than one power source 10 in use or be ready for use so as not to be limited to the life of one battery/power source. The female three-prong plug 16 may be disposed along a periphery of the power source body 10. The female two-prong plug 14 and the male prong 12 may be disposed on opposing faces of the power source body 10 in the piggybacked configuration, and so the two- or three-prong electrical connection 20 can electrically connect the male prong 12 of a first power source 10 to the female three-prong plug 16 of an adjacent second power source 10, as illustrated in FIG. 4.

The power source 10 and 56 can be interchangeable for various tools and electronic devices 40. The power sources 10 and 56 can be adapted to power an AC and/or DC electrical tools, and in certain embodiments by adding a power inverter, use of a universal motor, or the like.

As a corollary, the tool or device itself using the present power supply system would not have a battery/power source in it, with the exception of tech objects such as smart devices. These tools, instead of a spot for its battery, may have a short electrical cord (coiled or not) with a male plug for electrically connecting to the female plugs 14 and 16 of the power source 10, or alternatively a female socket for mating with the mail prong 12 of the power source 10. All battery life would be provided by the wearable's associated power source 10 or 56. In certain embodiments, the power sources 10 and 56 may be wireless, forgoing the electrical connections, and thus enabling even further freedom of movement.

The present invention may embody a wearable power assembly providing a wearable retaining a power source 10, and a tool adapted to be powered by the retained power source 10. An electrical connection 22 or 24 may be a two-prong or three-prong spiral cord connecting the tool to the power source 10. The power source 10 may provide DC electricity in the form of batteries with parallel circuitry. A re-charger unit 58 may be provided, wherein the re-charger unit is adapted to charge three batteries at one time.

A method of using the present invention may include the following. Providing the wearables provide a power supply enclosure formed by the aforementioned pockets for storing the power source 10 or 56 and associated electrical connections 22, 24 and 54. The wearable clothing would be designed for usability. A user 60 would don the wearable and, via the electrically connection(s) 22, 24 and 54, interconnect the power supply 10 or 56 to their tool or device.

With the wearable power supply system, a user can wear a backpack 38 or vest 30 with two or three piggybacked power sources 10 that would be used for, example, a drill and a short cord would come from the exemplary backpack 38 to the drill. Thereby, the power source 10 would become part of the person's life and become something they would wear every day. Taking another example, a lithium battery for a lawn tool is about 40 volt and weighs about 1-2 lbs. Most people would not mind carry 1-2-4-6 pounds on their person to get a job done efficiently and for longer periods of time, such as lawn work. Alternatively, the user may pull out the electrical connection 22 or 24 from the power supply enclosure of the apron 26 wearable for powering carving knives, slow cookers, mixers, blenders and the like where convenient instead of being limited to a kitchen counter having a power source. Alternately a regular electrical cord can be injected into the tool above to be used at an electrical outlet at the kitchen counter.

It should be understood, of course, that the foregoing relates to exemplary embodiments of the invention and that modifications may be made without departing from the spirit and scope of the invention as set forth in the following claims.

What is claimed is:

1. A wearable power supply assembly, comprising:
   a wearable providing a power supply enclosure, wherein the wearable is dimensioned and adapted to be worn by a human user; and
   a power supply removably housed in the power supply enclosure, wherein the power supply includes a piggybacked configuration of a plurality of batteries;
   each battery of the plurality of batteries comprises
      a first female plug provided along its periphery;
      a second female plug provided on a second face; and
      a male prong provided on a first face, wherein the first face is on an opposing side of said battery relative to the second face, and wherein the male prong and the second female plug align for each two adjacent batteries of the plurality of batteries in the piggybacked configuration.

2. The wearable power supply assembly of claim 1, further comprising a tool not having a separate power supply attached thereto.

3. The wearable power supply assembly of claim 1, further comprising a first electrical connection interconnecting the tool and the power source.

4. The wearable power supply assembly of claim 1, further comprising a second electrical connection electrically connecting the male prong and the first female plug of each two adjacent batteries of the plurality of batteries in the piggybacked configuration.

5. A wearable power supply assembly, comprising:
   a wearable providing a power supply enclosure, wherein the wearable is dimensioned and adapted to be worn by a human user;
   a power supply removably housed in the power supply enclosure, wherein the power supply includes a piggybacked configuration of a plurality of batteries;
   a tool not having a separate power supply attached thereto;
   a first electrical connection interconnecting the tool and the power source;
   each battery of the plurality of batteries comprising:
      a first female plug provided along its periphery;
      a second female plug provided on a second face;

a male prong provided on a first face, wherein the first face is on an opposing side of said battery relative to the second face, and wherein the male prong and the second female plug align for each two adjacent batteries of the plurality of batteries in the piggy-backed configuration; and a second electrical connection electrically connecting the male prong and the first female plug of each two adjacent batteries of the plurality of batteries in the piggybacked configuration.

6. The wearable power supply assembly of claim 1, wherein the wearable is an apron.

7. The wearable power supply assembly of claim 1, wherein the wearable is a vest.

\* \* \* \* \*